(12) United States Patent
Rudduck

(10) Patent No.: US 7,351,940 B2
(45) Date of Patent: Apr. 1, 2008

(54) PRODUCT WITH MULTIPLE FUNCTIONS, SUCH AS ON BOARD TECHNOLOGY, EG PANEL OR PIPE WITH ENHANCED SYSTEMS WITHIN

(75) Inventor: Dickory Rudduck, Seaforth (AU)

(73) Assignee: Telezygology Inc., Milsons Point (AU)

( * ) Notice: Subject to any disclaimer, the term of this patent is extended or adjusted under 35 U.S.C. 154(b) by 228 days.

(21) Appl. No.: 10/347,168

(22) Filed: Jan. 17, 2003

(65) Prior Publication Data

US 2003/0235661 A1 Dec. 25, 2003

Related U.S. Application Data

(63) Continuation of application No. PCT/AU01/00876, filed on Jul. 19, 2001.

(30) Foreign Application Priority Data

Jul. 19, 2000 (AU) .................................... PQ8855

(51) Int. Cl.
*H05B 3/44* (2006.01)
*F24D 19/02* (2006.01)

(52) U.S. Cl. .................................... 219/544; 392/436

(58) Field of Classification Search ................ 219/544, 219/535, 213; 392/432–439; 156/71, 273.9, 156/275.5, 273.5
See application file for complete search history.

(56) References Cited

U.S. PATENT DOCUMENTS

| | | | | |
|---|---|---|---|---|
| 2,662,045 A | * | 12/1953 | Baggott | 156/183 |
| 3,263,268 A | * | 8/1966 | Flaherty | 16/222 |
| 3,346,442 A | * | 10/1967 | Carmody | 428/118 |
| 3,348,640 A | * | 10/1967 | Thompson et al. | 188/250 G |
| 3,438,843 A | * | 4/1969 | Pagel | 428/40.1 |
| 3,468,747 A | * | 9/1969 | Tatnall | 442/10 |
| 3,755,066 A | * | 8/1973 | Rose | 428/383 |
| 3,756,881 A | * | 9/1973 | Denman | 156/108 |
| 4,038,120 A | * | 7/1977 | Russell | 156/71 |

(Continued)

FOREIGN PATENT DOCUMENTS

DE 2154037 * 5/1973

(Continued)

OTHER PUBLICATIONS

Supplemental European Search Report for European Patent Application No. 01955120.9.

*Primary Examiner*—Daniel Robinson
(74) *Attorney, Agent, or Firm*—Wilmer Cutler Pickering Hale and Dorr LLP

(57) ABSTRACT

The invention relates to a product, which may take a wide variety of forms but which is exemplified by a pipe or a panel. The product has a first function, such as that normally expected of a pipe or a panel, and a second function different from the first. The second function is chosen from a group consisting of: delivery of energy, for a first purpose, delivery of energy for a second purpose, delivery of data for a first purpose, delivery of data for a second purpose, switching. The product has incorporated in its means capable of enabling the product to be used as medium to perform the second function. The invention also concerns a method of manufacturing the products.

6 Claims, 16 Drawing Sheets

U.S. PATENT DOCUMENTS

| | | | | |
|---|---|---|---|---|
| 5,061,332 A | * | 10/1991 | Stolz et al. | 156/94 |
| 5,389,184 A | * | 2/1995 | Jacaruso et al. | 156/378 |
| 5,700,337 A | | 12/1997 | Jacobs et al. | |
| 6,021,613 A | | 2/2000 | Reuter et al. | |
| 2002/0134543 A1 | * | 9/2002 | Estes et al. | 165/277 |

FOREIGN PATENT DOCUMENTS

| | | | |
|---|---|---|---|
| DE | 3331199 | * | 3/1985 |
| DE | 3831787 | * | 4/1989 |
| DE | 4101215 | * | 7/1992 |
| DE | 19652678 | * | 3/1998 |
| EP | 128837 | * | 12/1984 |
| EP | 290016 | * | 11/1988 |
| EP | 382602 | * | 8/1990 |
| FR | 2562613 | * | 10/1985 |
| FR | 2660340 | * | 10/1991 |
| GB | 1115197 | | 5/1968 |
| GB | 1510121 | * | 5/1978 |
| JP | 58-69275 | * | 4/1983 |
| JP | 62-109877 | * | 5/1987 |
| JP | 9-94908 | * | 4/1997 |
| NL | 1010472 C2 | | 5/2000 |
| WO | WO 94/12338 A | | 6/1994 |
| WO | WO 99/47819 A | | 9/1999 |
| WO | WO 00/27941 A | | 5/2000 |
| WO | WO 00/59568 A | | 10/2000 |

* cited by examiner

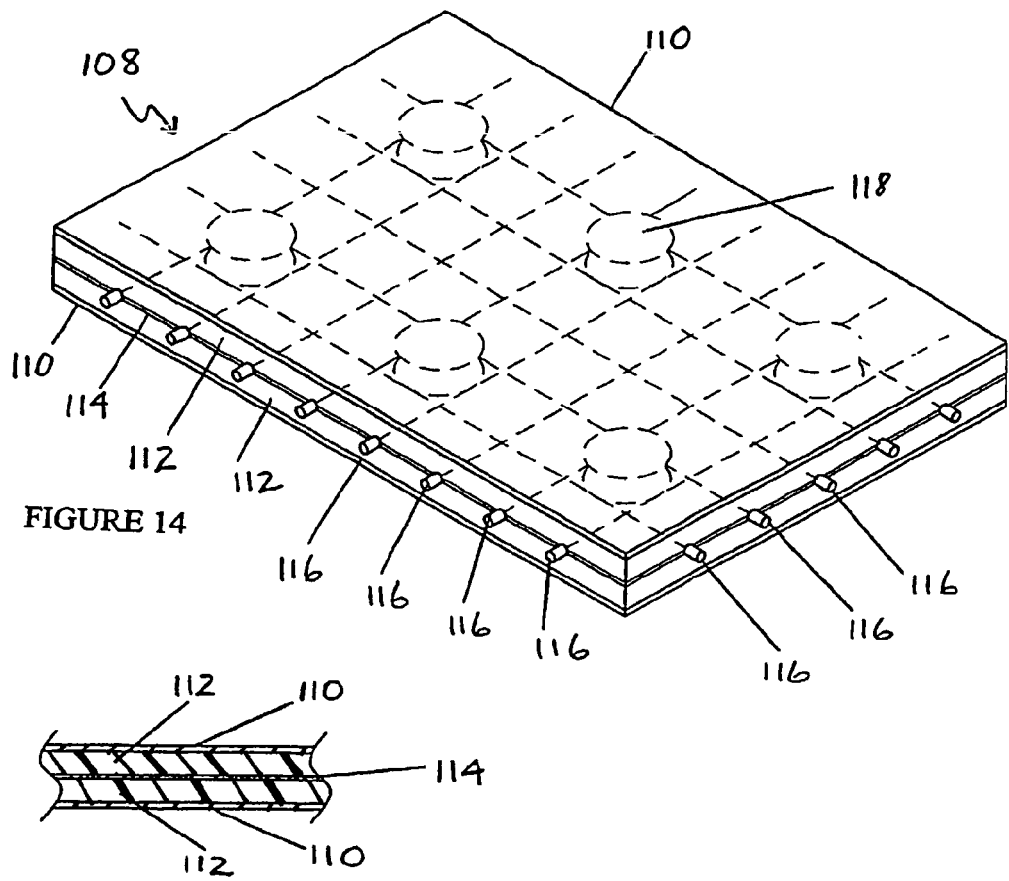
FIGURE 14
FIGURE 15
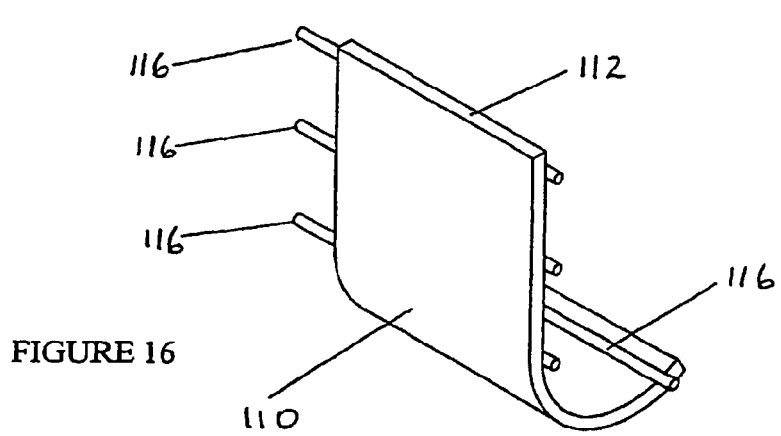
FIGURE 16

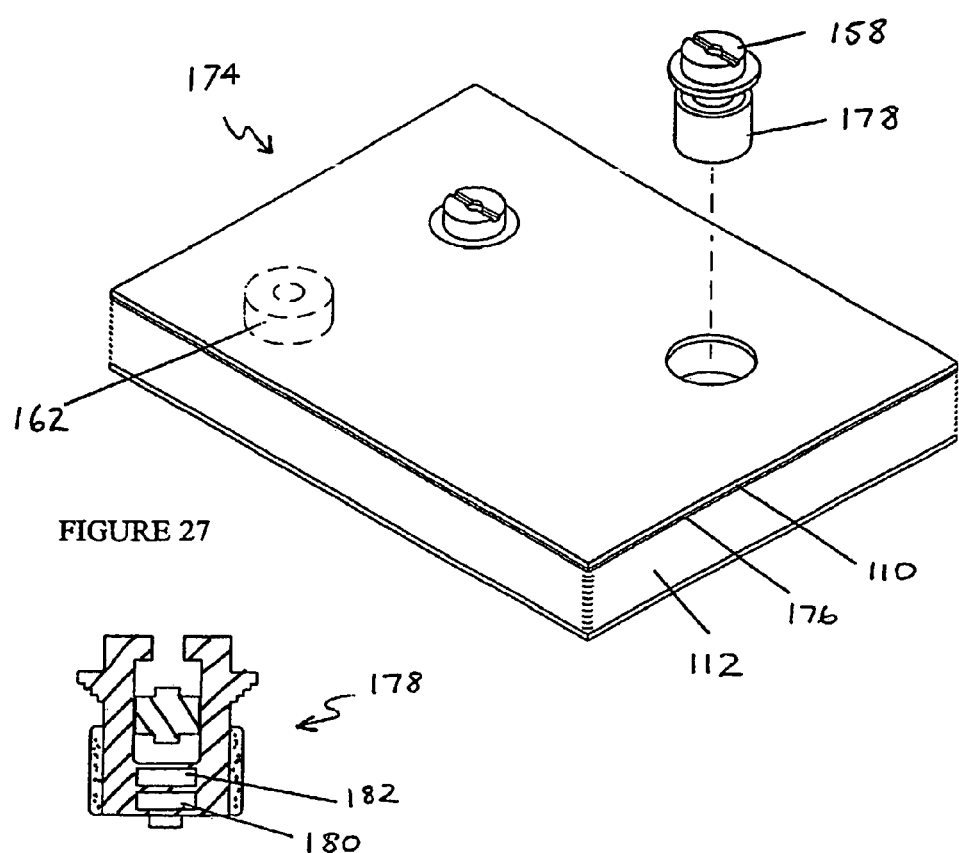
FIGURE 27
FIGURE 28
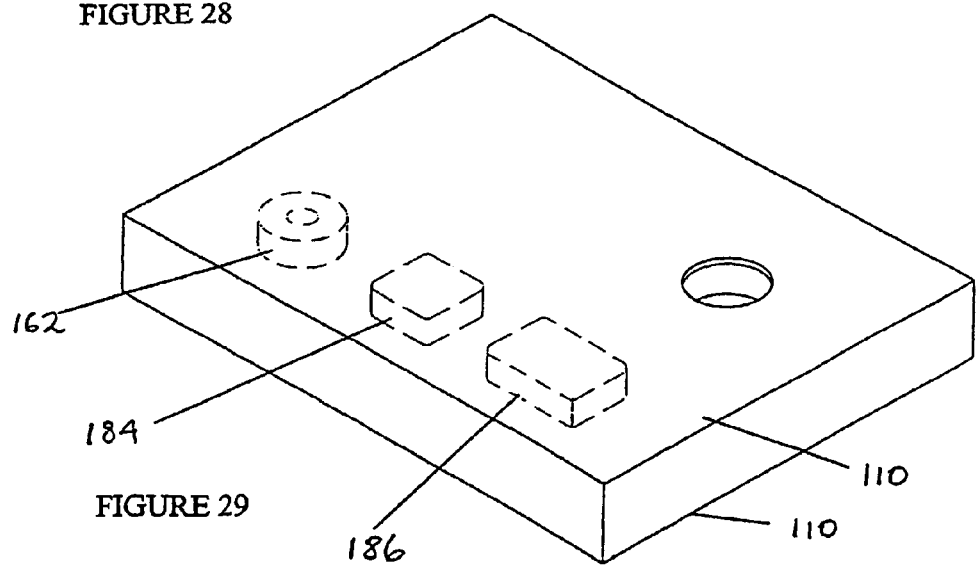
FIGURE 29

PRODUCT WITH MULTIPLE FUNCTIONS, SUCH AS ON BOARD TECHNOLOGY, EG PANEL OR PIPE WITH ENHANCED SYSTEMS WITHIN

TECHNICAL FIELD

This invention relates to the enhancement of products, generally with a view to enabling a product to perform or be used in an improved manner.

BACKGROUND ART

The concept of "on board technology" was introduced in International Patent Application No. PCT/AU99/00185 (WO 99/47819) and the contents of this are imported herein by reference.

In WO 99/47819, an aspect of "on board technology" was disclosed in connection with elements such as building panels, where one panel had protrusions and another recesses or pits adapted to receive the protrusions, so that one panel could be fixed to the other.

The present application deals with other aspects of "on board technology" which, as will be apparent from the description below, has far, far wider application than that of the building industry.

DISCLOSURE OF THE INVENTION

A product being a pipe, panel, sheet or partly formed product, the product having a first function as, respectively, a part, panel, sheet or partly formed product and a second function different from the first, the second function being two or more of those chosen from the group consisting of delivery of energy for a first purpose, delivery of energy for a second purpose, delivery of data for a first purpose, delivery of data for a second purpose and switching, wherein there is incorporated in the product or in part thereof means capable of enabling the product to be used as a medium to perform the second function.

In relation to this first aspect, the invention also provides a method of manufacturing the product, the method including the step of adding to or incorporating in the product, or in an element of it, the means capable of enabling the product to be used as the medium to perform the second function.

The product with which the invention is concerned may be chosen from an extremely broad range, the method of the invention having wide application. By way of non-limiting example the following may be mentioned: panels, building boards, cladding, structures (such as walls, floors, buildings) and pipes.

Such a product may be, for example, a panel from which a wall is constructed, or cladding on a satellite. Other types of product are within the scope of this invention, as will be appreciated by one skilled in the art.

The first function of the product of the invention is the normal function of the product. For example, the product may be a panel or a pipe and the first function is that normally expected of a panel or a pipe.

The second function which is chosen from the specified group can enhance the product by enabling it to be a passive or active part of a larger system which includes, for example, delivery of energy and data. The second function may also enable improved assembly of the product itself to other structures.

In relation to the aspect of the second function being delivery of energy, this can involve delivery of many types of energy. The means capable of enabling the product to be used as a medium to deliver energy are, for example, buses applied to the product or elements of it, electrical energy transfer means, and pneumatic or hydraulic energy transfer means.

The delivery of energy may be for a first purpose, such as melting adhesives. The delivery of energy may be for a second purpose, such as activation of a fastener. The first purpose is different from the second purpose.

In relation to the aspect of the second function being delivery of data, this may involve various data transfer means, for example transfer of data in a networking environment. Delivery of data for the first purpose may be, for example, to unlock a fastener. Delivery of data for the second purpose may be, for example, to lock the fastener.

The two or more second functions may be carried out using a single medium, such as a cable, for example.

In relation to the second function being switching, this may involve switching of the product or an element of it between different states. For example, the product may be a pipe which is switchable between an open and a closed state so that material or fluid is able or unable to flow through the pipe. Switching may also involve imprinting the product or an element of it with a knowledge or logic of how to fix itself to another object, or of steps to be it in a procedure.

Optionally, in the product of the invention the second function may also be chosen from the group consisting of recordal, storage, processing and communication. The second function may involve two or more of the foregoing.

The aspects of recordal and storage may include memory, such as the recordal of data relating to the product or its elements, perhaps in a random access memory (RAM). Recordal may also relate to recordal of a memory for the product or an element in it, such as a material, which is imprinted with a memory whereby it has an ability to return to a particular state or shape.

The processing aspect may involve processing of data or instructions. For example, built-in logic may cause the product or part of it to refer to data (such as data in a memory) and to perform an operation. An example is a structure which is serviced on a first occasion, during which fasteners for the structure are opened in a particular order. The product or an element of it may retain the memory of that order and cause the fasteners to open in the same order on the next occasion on which the structure is serviced.

Communication may be with a third party, a remote database, a global positioning system or a sensor system (sensing heat, proximity, etc.), for example.

In relation to the method of the invention, the adding step is preferably performed during what would be regarded as the normal manufacturing process, although the adding step may also be performed post-manufacture.

By use of the product of the invention, it may be possible to improve assembly and/or operation or function of the product. By way of non-limiting example, assembly may be improved by enabling assembly to take place remotely, or by triggering an assembly step when a product or element of it is placed in a particular juxtaposition.

Operation may be improved in various ways, such as by enabling remote operation of a valve or tap, for example.

The product of the invention may include at least one fastener, the first purpose comprises the delivery of energy or data to the fastener and the second purpose comprises the delivery of energy adapted to affect the shape of the product or the relationship of the product to another product.

Certain brief illustrations of the methods and products of the invention are set out below, followed by more detailed examples described in connection with the drawings.

In connection with the invention in which the second aspect is delivery of energy, the product may be a composite panel comprising conductive layers sandwiching plastic layers, or layers of some other insulating material. Each plastic layer may be printed with or include circuitry which, when connected by a conducting fastener or other means passing through the panel, connects the circuitry to effect a desired result in energy delivery.

As a further example, a computer circuit board may be manufactured with holes drilled through it The board is imprinted with means which causes the board to fuse to any material which is inserted in the drilled holes.

As a further illustration of energy delivery, the product may be a pipe of non-conducting material, except that during manufacture the pipe is extruded with one or more wires or metal plated areas inside or out, so that when a second means causes activation, the pipe can conduct an electrical current. The second means may be water passing through the pipe (in the case where the wires or metal plating are inside the pipe). This method of energy delivery may be less costly and/or more efficient than other more traditional methods. The pipe may also deliver data.

In connection with the invention where the second aspect is switching, an illustration is as follows. A pipe, such as that described above which provides delivery of energy and/or data may include means which enables material flowing through the pipe to be halted. For example, the pipe may include a valve which can be opened or closed, preferably by remote activation, some examples of which are included in WO 99/47819. As a further example, the energy delivered via the pipe may be pneumatic, combined with switching to open or close a valve in the pipe.

In another aspect, the invention also provides a panel including a plurality of projectile capsules, each having a projectile element and an impelling material adapted to project the projectile element out of the panel upon activation of the impelling material.

BRIEF DESCRIPTION OF THE DRAWINGS

The invention will now be described in connection with non-limiting examples illustrated by the accompanying drawings, in which:

FIG. 14 is a perspective view of a further example, being a panel;

FIG. 15 shows the sandwich type of construction of the panel in FIG. 14;

FIG. 16 shows part of the panel of FIGS. 14 and 15 after part of it has been curved;

FIG. 27 is a perspective view of a further panel having an internal power supply and a fastener addressable by a broadcast system;

FIG. 28 is a sectional detailed view of one of the fasteners in FIG. 27;

FIG. 29 is a perspective view of a wireless data switched device having an internal power supply, a communication device and a processor/memory;

DETAILED DESCRIPTION OF THE DRAWINGS

Figure 1:
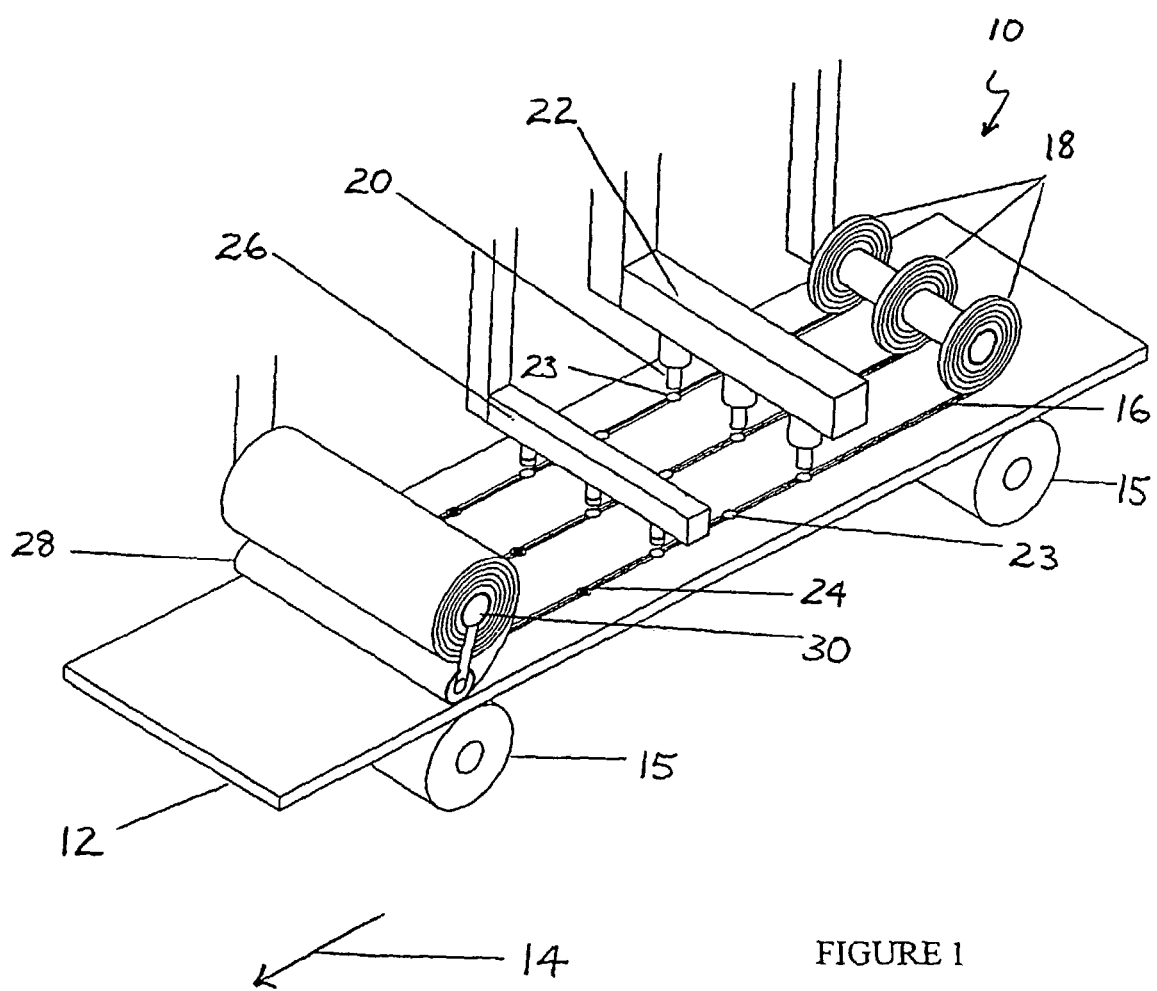
FIG. 1 is a perspective view of a first example of the method and product of the invention.

In FIG. 1, the product is plasterboard panel 10, shown in the process of manufacture. The first function of panel 10 is that of an internal panel used for building. The second function is that of power delivery.

During manufacture, calcium sulphate slab 12 travels in the direction of arrow 14, assisted by rollers 15. As it does so, wire, tape, fibre or other suitable conductive material 16 is fed from spools 18 onto slab 12. Drill heads 20 on arm 22 drill apertures 23 through wire 16. Fasteners 24 are inserted by head 26 into apertures 23 as they pass under head 26.

Paper or other suitable material 28 is fed from roll 30 to overlie wire 16 and deposits 24. If desired, paper 28 may incorporate a bus or network.

If desired, the underneath of panel 10 may be treated in the same way.

Figure 2:
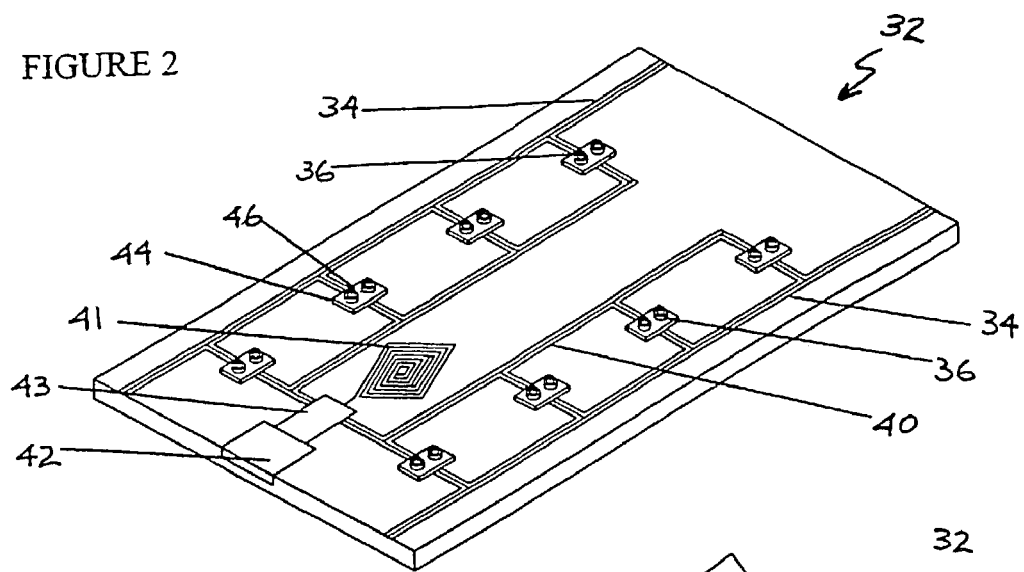
FIGS. 2 and 3 are perspective views of a second example, being a panel for a satellite shown in FIG. 4.

Reference is made to FIG. 2, in which panel 32 is made of suitable insulating material and carries on board buses 34 and electrically activatable fasteners 36.

Figure 3:
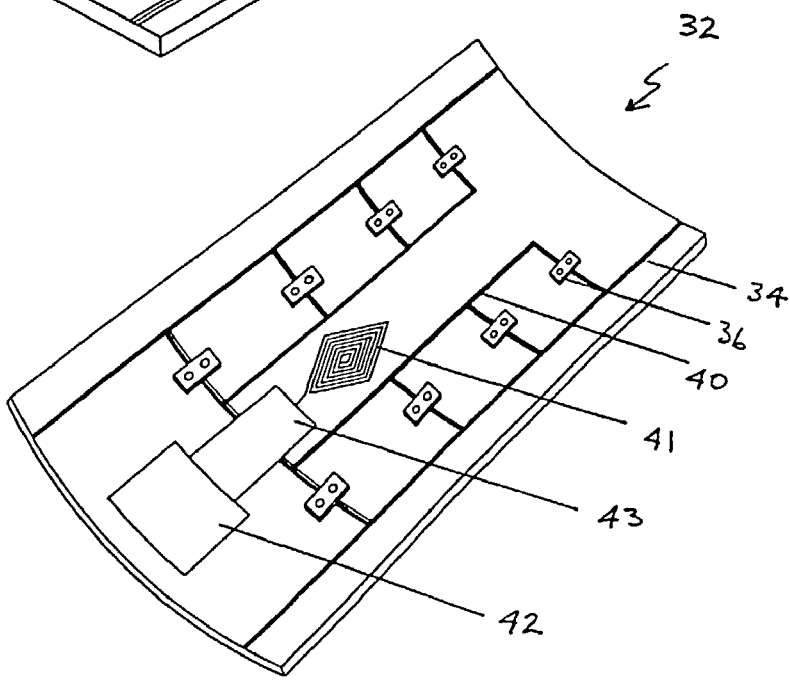

Panel 32 is initially flat as shown in FIG. 2, but through the application of electric or heat energy is caused to change shape as shown in FIG. 3. Further details of how panel 32 may be caused to change shape are set out in relation to FIGS. 14 to 16 below.

Panel 32 may be fastened to satellite substructure 38 (refer FIG. 4) by activating a power supply (not shown), causing fasteners 36 to attach to suitable sites (not shown) on substructure 38. Buses 34 deliver energy from the power supply to fasteners 36.

Also incorporated in panel 32 are on-board data network 40, aerial 41, memory/processor module 42 and communication module 43 (eg, operating via a global satellite positioning system). Local processor 44 communicates with contact switch 46. Fasteners 36 include monitors (not shown).

Figure 4:
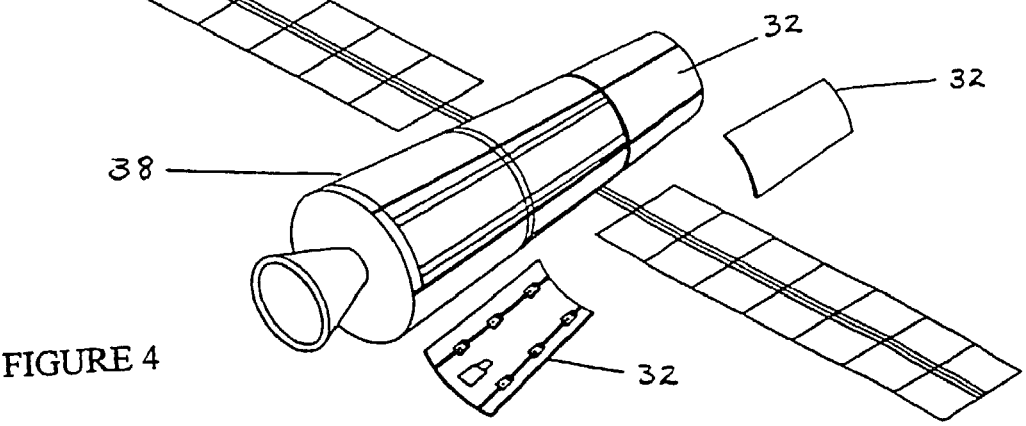

As shown in FIG. 4, panels 32 may be assembled onto substructure 38 in an inhospitable environment such as space to form a total assembly. Each panel 32 is sequentially fixed, via fasteners 36. Telemetry is used to effect fastening; energy is delivered by buses 34 to fasteners 36, activated via data network 40 on software command from memory/processor module 42. All parts of the assembly may be monitored, until such time as the assembly is disassembled, which may also be carried out remotely using the components built into panels 32.

Figure 5:
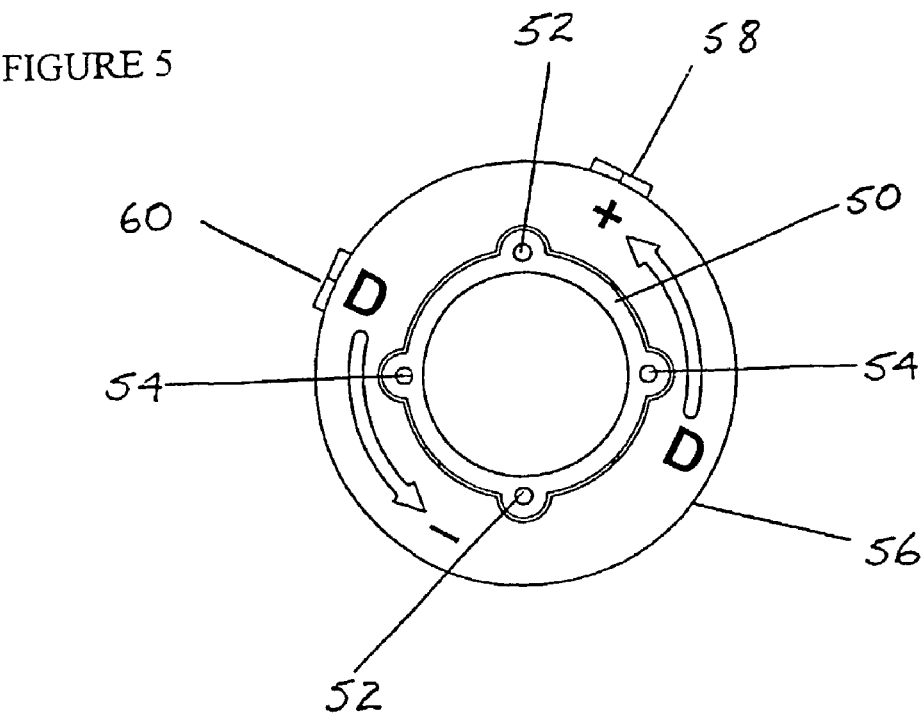
FIGS. 5 and 6 are end views of a third example.

Shown in FIG. 5 is a pipe which can deliver energy and data.

Figure 6:
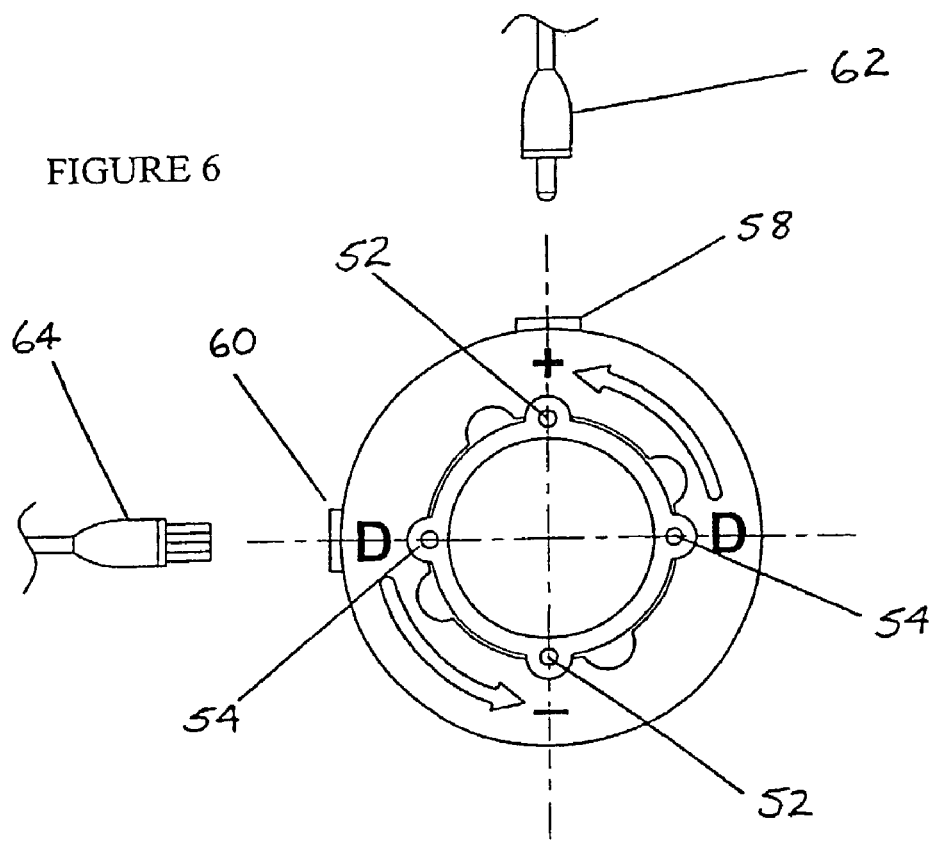

In this example, pipe 50 has built-in power cables 52 and data cables 54. Pipe 50 is conveniently joined by coupling 56. Coupling 56 includes connector 58 for power take off or supply 62 and connector 60 for data input and/or output 64 (refer FIG. 6).

Figure 7:
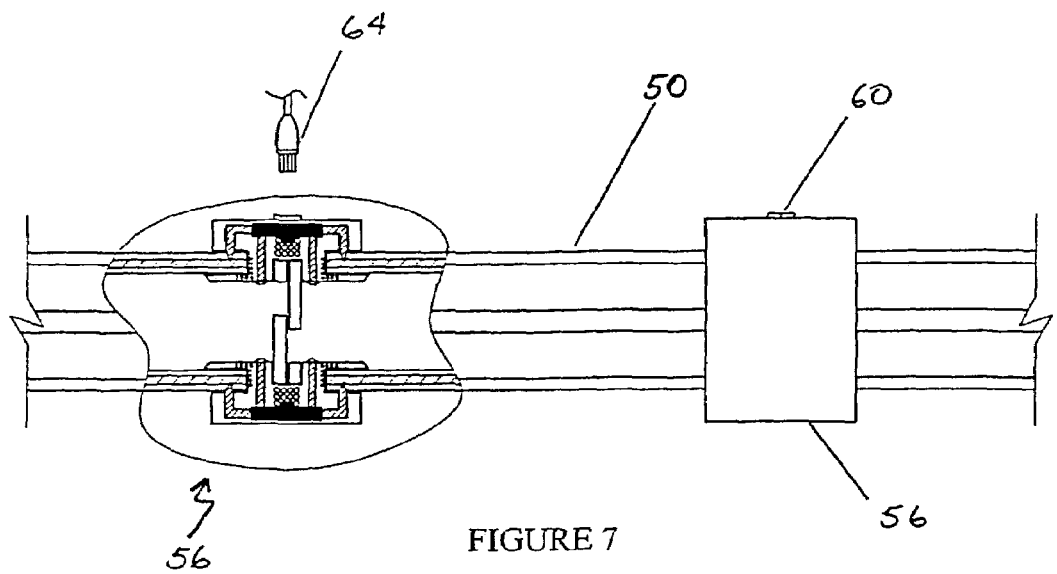
FIG. 7 is a top view of the pipe of FIG. 6.
Figure 8:
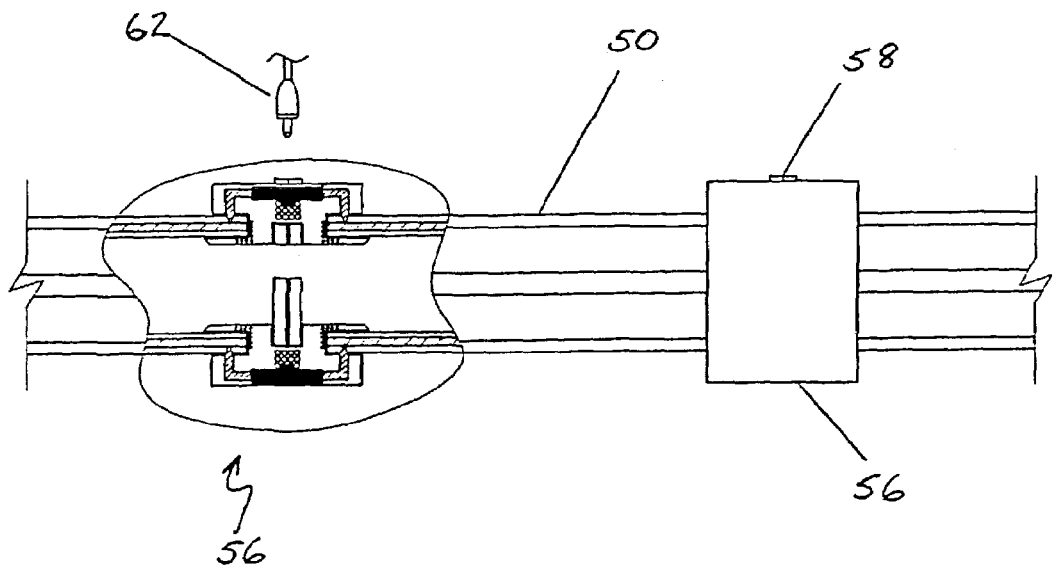
FIG. 8 is a side elevation of the pipe of FIG. 6.

FIG. 7 shows two couplings 56 in line on a pipe 50, illustrating attachment by data input/output 64, while FIG. 8 shows a corresponding view for power take off/supply 62. More detail of couplings 56 is shown in FIGS. 9 and 10, below.

Figure 9:
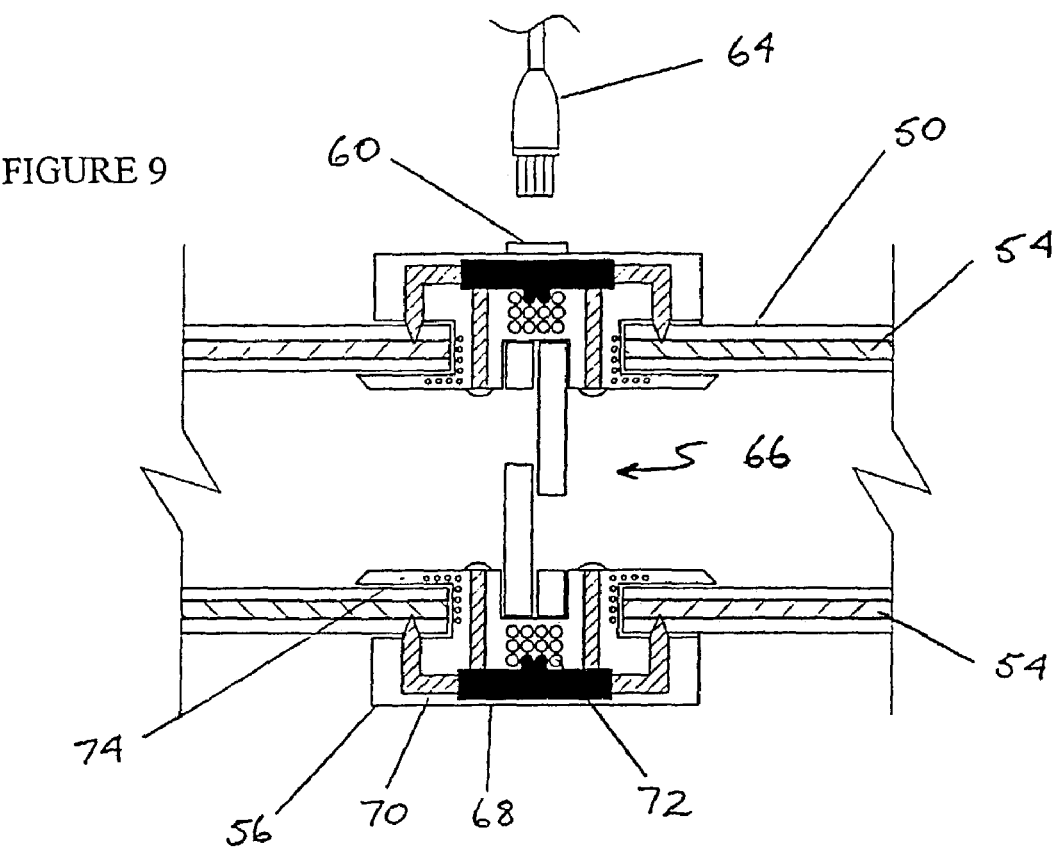
FIG. 9 is a detail of a coupling for the pipe of FIGS. 5 and 6, involving delivery of data.
Figure 10:
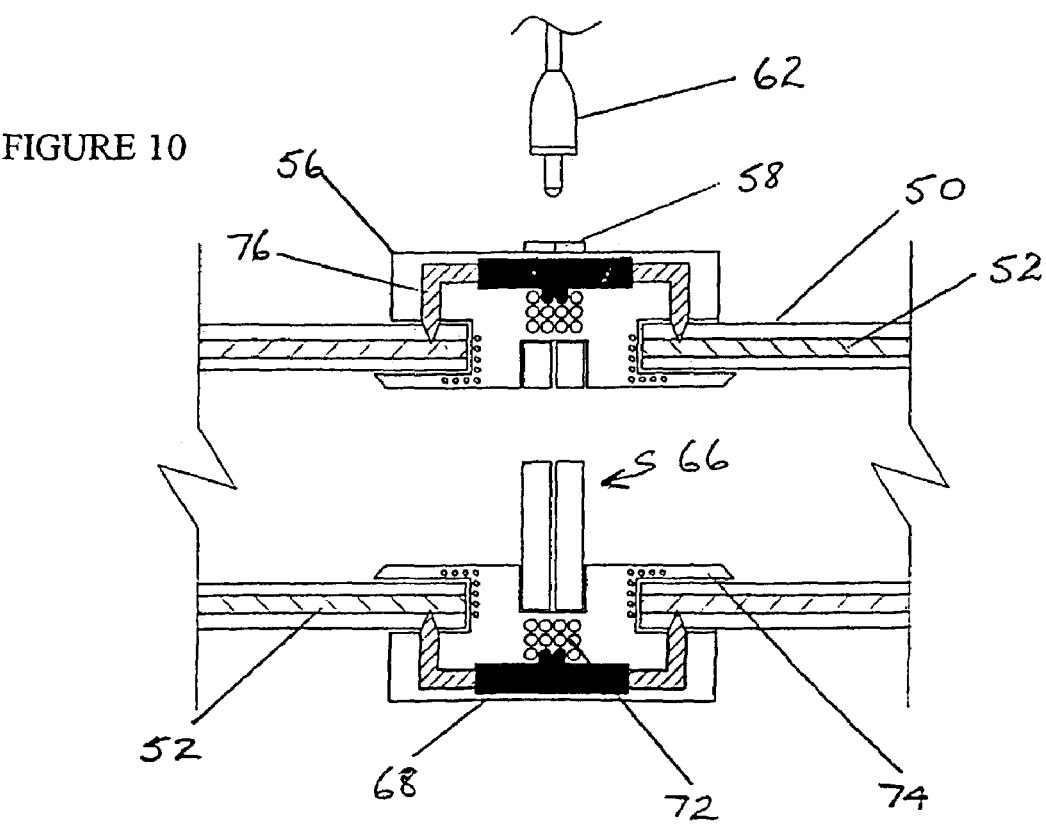
FIG. 10 is a detail of a coupling for the pipe of FIGS. 5 and 6, involving delivery of power.

Turning now to FIG. 9, this shows in more detail couplings 56 involving delivery of data and also "switching", being the opening and closing of valve 66. In FIG. 9, valve 66 is shown in the closed position.

Pipe 50 includes in its wall data cable 54 which is connected to processor 68 by data contact 70. Processing 68 communicates with connector 60, into which data input/output plug 64 may be inserted.

Valve 66 is switched between the open and closed positions by means of activating coil 72 which in this embodiment is activated by data delivery via processor 68.

This embodiment also shows couple 74 which can provide heating to fuse coupling 56 to pipe 50 by melting adhesive (not shown) when coupling 56 is first joined to pipe 50.

The view in FIG. 10 is at right angles to that in FIG. 9.

In FIG. 10, valve 66 is shown in the open configuration after the operation of activating coil 72.

Power cable 52 communicates with connector 58 via power contact 76. Power take off or supply 62 can be inserted in connector 58.

It will also be appreciated that it may be possible to combine power cable 52 and data cable 54 into a single conduit in pipe 50.

Figure 11:
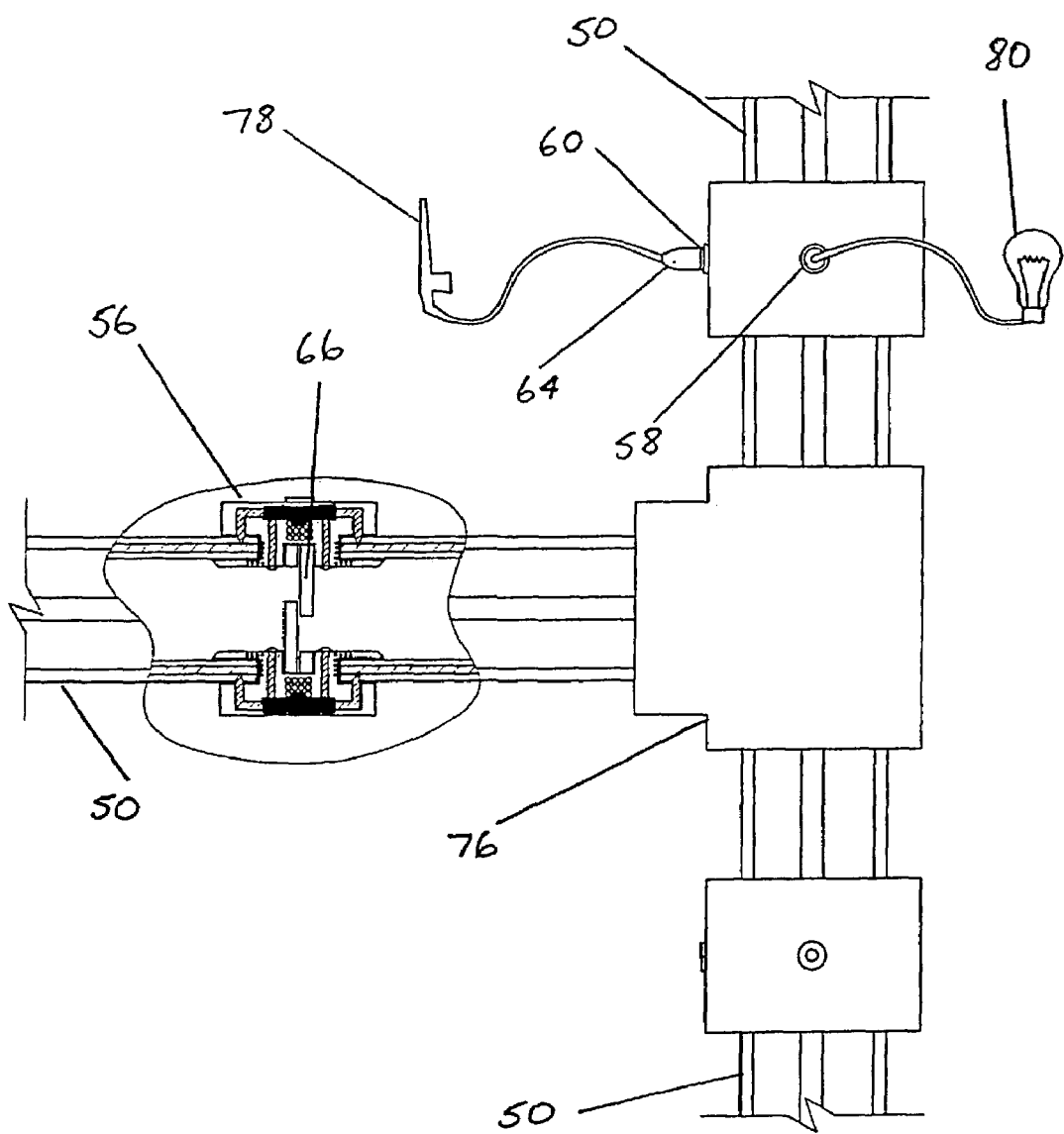
FIG. 11 is a variation of the arrangement in FIGS. 7 and 8, showing a coupling forming a "T" intersection.

Whereas in FIGS. 7 and 8 couplings 56 were shown in line, it is possible to have a similar coupling 76 which permits a "T" intersection for pipes 50 and this is shown in FIG. 11. Pipes 50 will thus carry water (or other fluid) as well as power and data.

The arrangement in FIG. 11 is shown in an application in a garden. Humidity sensor 78 feeds data as to soil humidity via connector 60 into data cable 54 (not shown in this Figure). Data received from sensor 78 can cause switching of valve 66 so that valve 66 opens to allow the flow of water to the garden when soil humidity drops below a set value and causes closing of valve 66 when soil humidity has exceeded a chosen value.

Power delivered by pipe 50 can be used to power garden lights, one of which is shown at 80.

Figure 12:
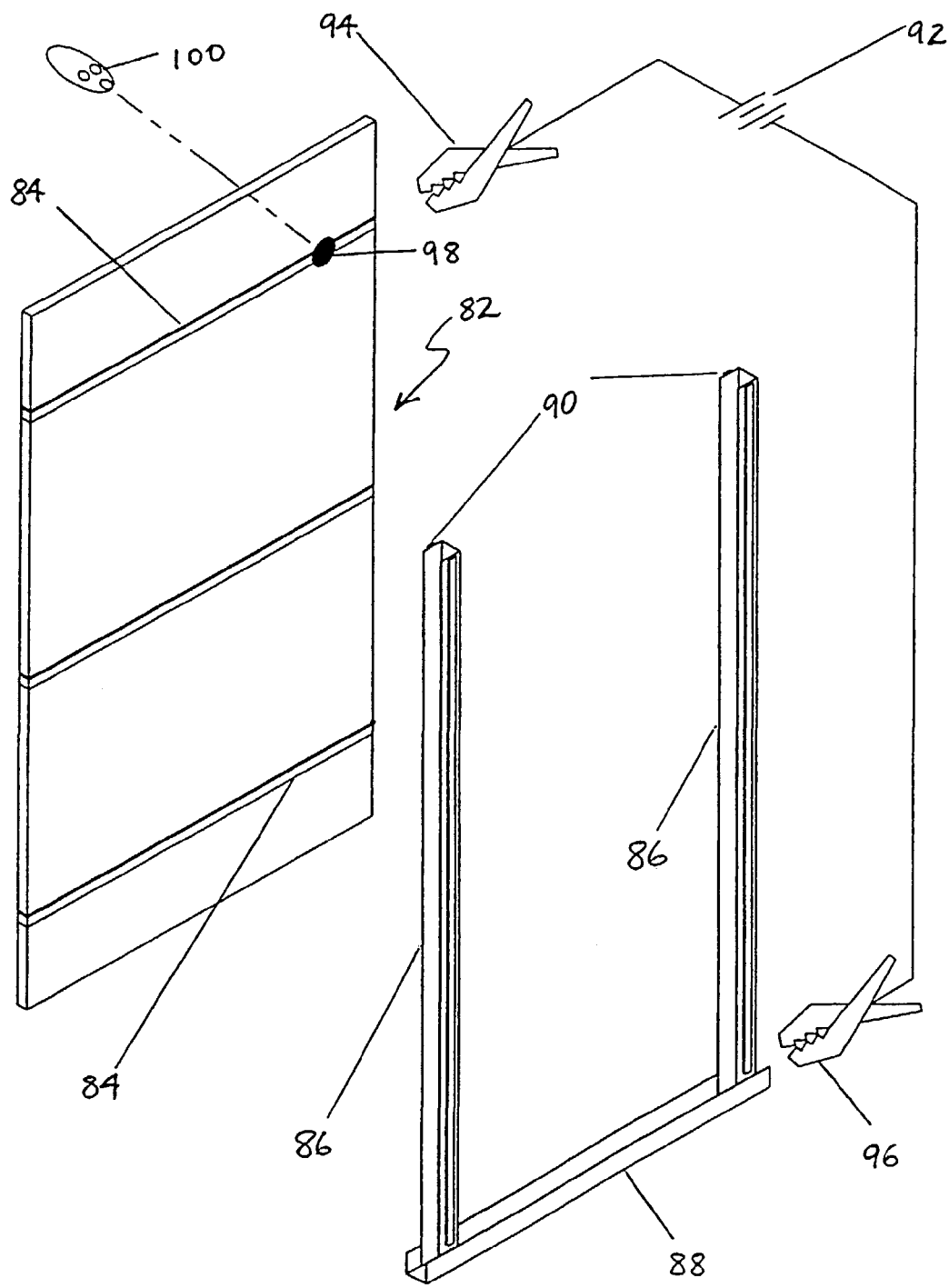
FIG. 12 is a perspective view of a fourth example.

The next example at FIG. 12 shows a product being panel 82, which has incorporated in it conductive strips 84. Panel 82 is to be affixed to studs 86 mounted in track 88. Each of studs 86 includes a hot melt strip fastener 90 which is detailed in FIG. 13.

Power from source 92 is applied to panel 82 via clip 94 and earthed by the application of clip 96 to track 88. When panel 82 is placed in position against studs 86 the circuit is completed and power from power source 92 flows to heat fasteners 90 and adhere panel 82 to studs 86.

Alternately, conductive strips 84 can be specifically activated remotely via remote switch 98 in each of conductive strips 84 (only one is shown in FIG. 12), remote switch 98 being activated by a signal from tradesman's tool or other source 100.

Figure 13:
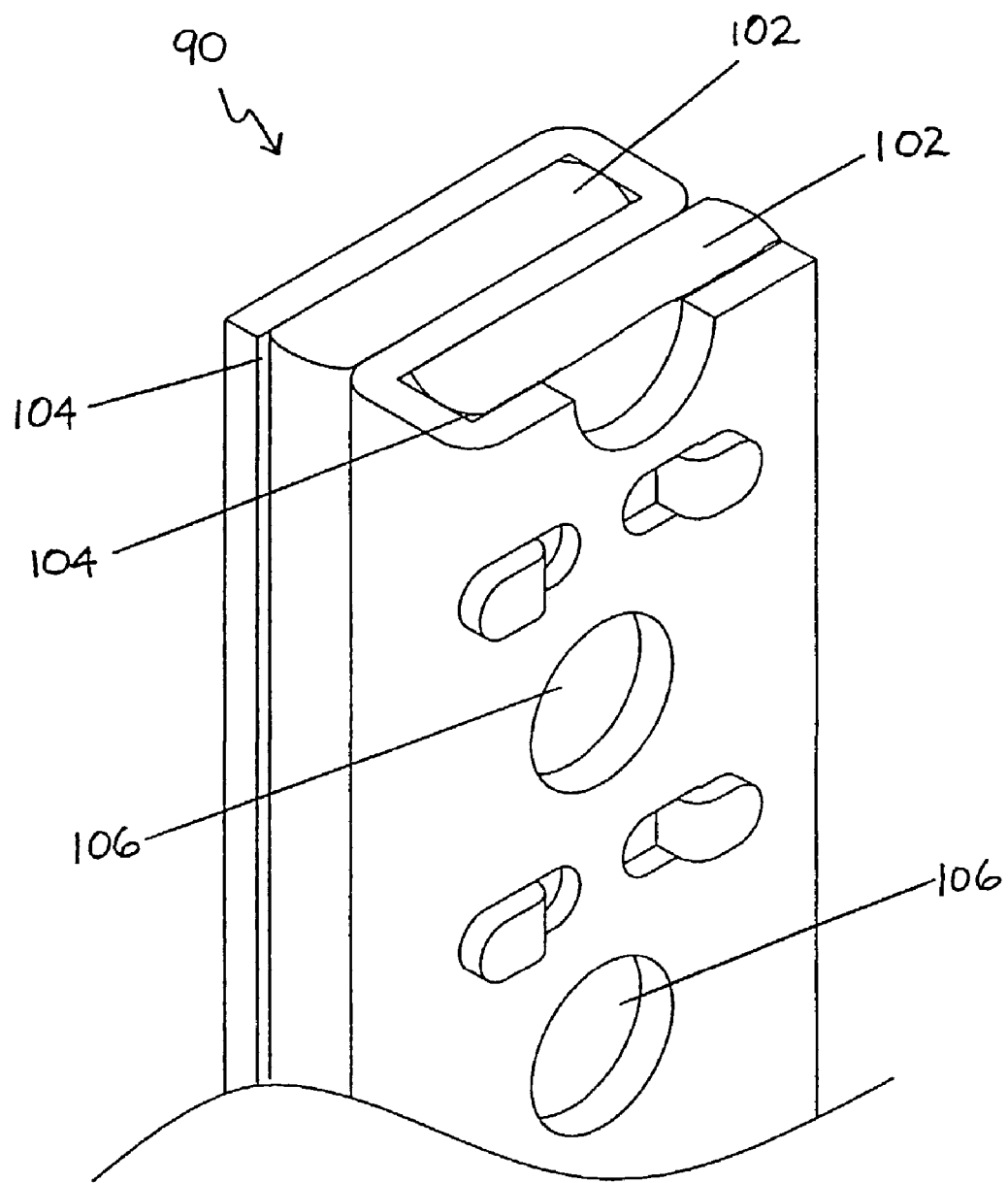
FIG. 13 shows a detail of FIG. 12.

FIG. 13 shows detail of hot melt strip fastener 90. Hot melt adhesive 102 is contained in channels 104 of fastener 90. Power flowing through conductive strips 84 when the circuit is completed as already described heats adhesive 102 which flow through apertures 106 to contact panel 82 and to effect adhesion. Hot melt adhesive 102, once cooled, may create a permanent bond or may create a reversible bond, so that if it is desired to remove panel 82 from studs 86, it is merely necessary to apply sufficient power to again melt the adhesive.

Turning now to FIG. 14, this illustrates the principle which can permit total or partial curving of a panel, such as discussed in connection with FIGS. 2 to 4, above. In the embodiment shown in FIGS. 14 to 16, panel 108 is made of sandwich construction, such as metal layers 110 and plastic layers 112. Centrally located is a layer of heat activatable adhesive 114, which is capable, when softened through the application of heat, to permit panel 108 to be curved and reset.

As can be seen from FIG. 14, panel 108 has incorporated in it wires or other fibres 116. When energy is applied to wires 116, heat is created sufficiently to soften adhesive 114.

Panel 108 also has internally embedded fasteners 118.

When heat is generated by means of the matrix formed by wires 116, panel 108 can be shaped as desired, either before or during application of panel 108 to its desired site, such as satellite substructure 38 in FIG. 4. Fastening can take place by means of embedded fasteners 118, for example in one of the manners described in application WO99/47819. When energy is no longer applied to wires 116, panel 108 can set in its new shape. This procedure can be reversible if desired. It will be appreciated that in FIG. 16 only part of panel 108 is shown, for convenience.

Figure 17:
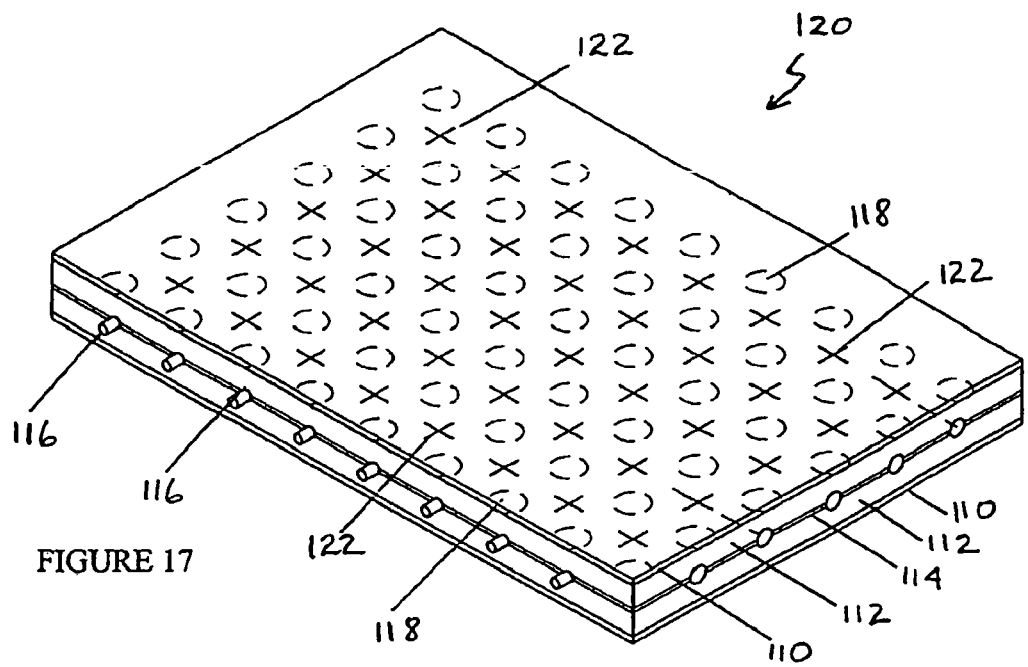
FIG. 17 is a perspective view of a panel similar to that in FIG. 14.

In FIG. 17, panel 120 has, like panels 108 in FIG. 14, wires 116 and embedded internal fasteners 118. In the embodiment in FIG. 17, however, panel 120 also includes heating elements 122.

Figure 18:
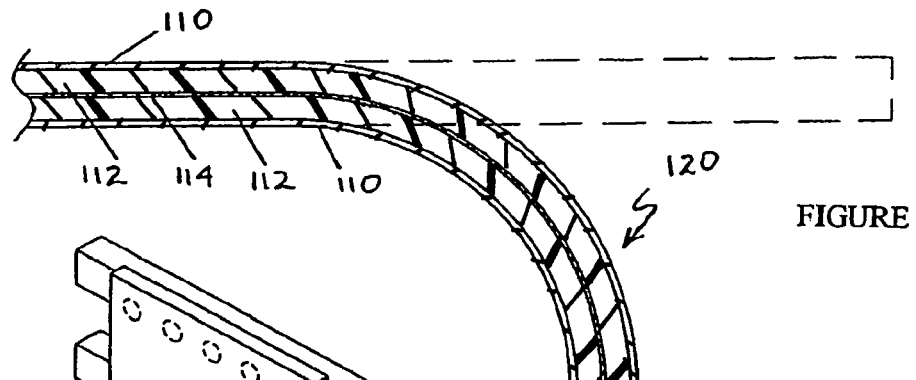
FIG. 18 shows the panel of FIG. 17 being shaped to a curve.

As was the case with the previous embodiment shown in FIG. 15, panel 120 is of sandwich construction, with metal outer layers and plastic inner layers separated by a line of hot melt adhesive. Power is supplied to heating elements 122 via wires 116 to cause panel 120 to curve from the flat form shown in FIG. 17 and in dotted outline in FIG. 18 to the curved form shown in FIGS. 18 and 19.

Figure 19:
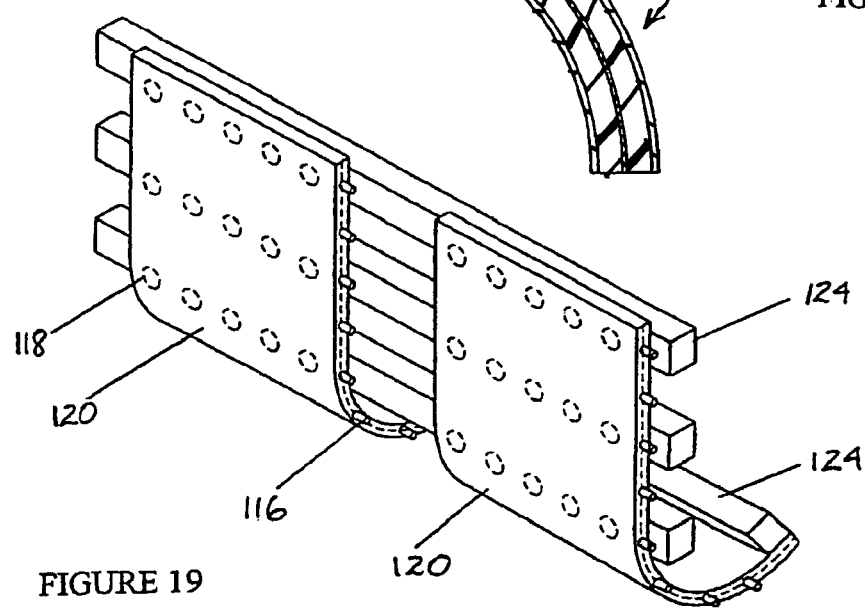
FIG. 19 shows two panels as in FIG. 17 attached to a structure.

FIG. 19 shows two of the curved panels 120 fastened to an underlying structure 124 by activation of fasteners 118.

Figure 20:
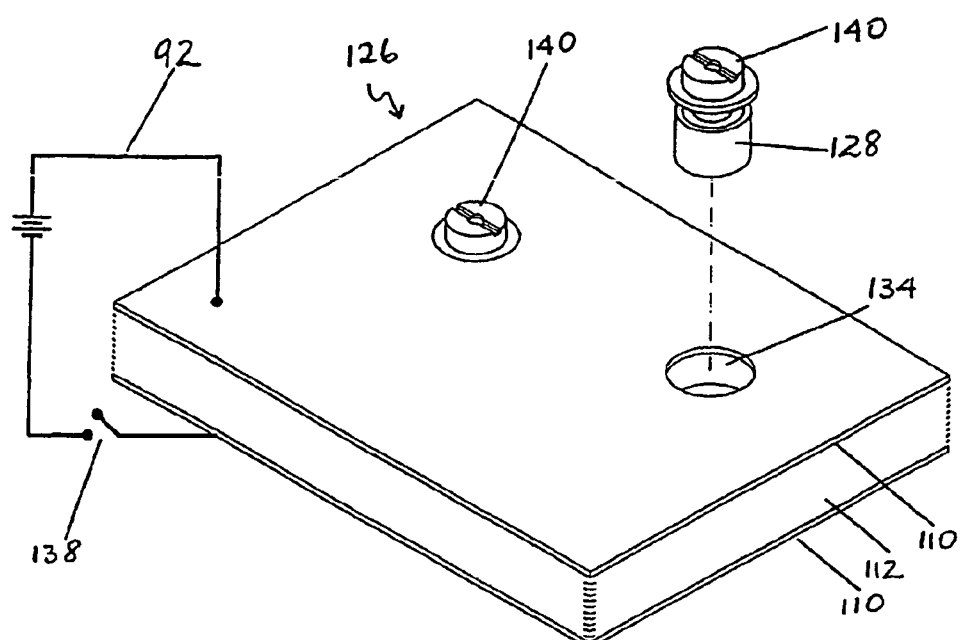
FIG. 20 is a perspective view of a panel having an external energy source.

Turning now to FIG. 20, panel 126 is of sandwich construction, having metal outer layers 110 and foamed plastic internal layer 112. In this example, panel 126 delivers electrical energy from an external source 92 to fasteners 128.

Figure 21:
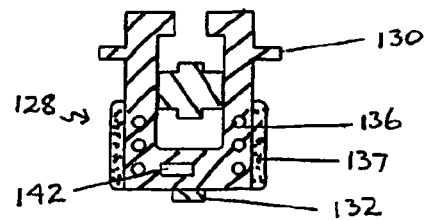
FIG. 21 is a cross sectional view of a fastener included in FIG. 20.

A detail of a fastener 128 is shown in FIG. 21. Fastener 128 is electrically activated in two ways. Fastener 128 has electrical contacts 130 and 132 which, when fastener 128 is installed in panel 126, make contact with metal layers 110. When fastener 128 is first inserted in cavity 134 in panel 126, hot melt heater 136 can be electrically activated by closing switch 138 on power source 92, to melt adhesive 137 to secure fastener 128 in cavity 134. Fuse 142 deactivates heater 36 if the melt procedure is to be irreversible. If switch 138 is then turned off, the next time it is turned on, it can cause fastener 128 to release or fasten, as the case may be. Fastener 128 will thus lock or release fastening component 140. Fastener 128 may fix or release reversibly or irreversibly, as desired.

Figure 22:
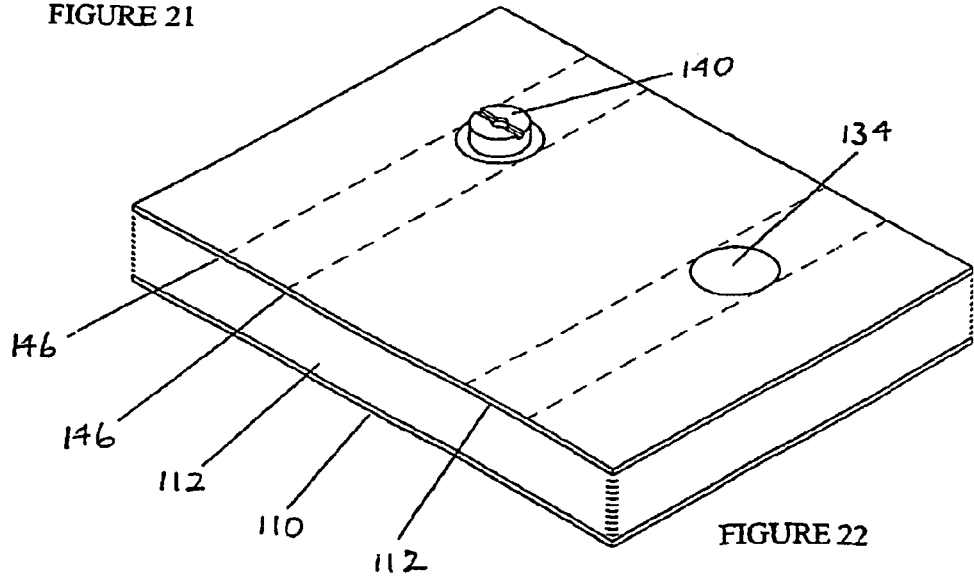
FIG. 22 is a perspective view of a panel similar to that in FIG. 20 but having an internal power supply and a surface data grid.

FIG. 22 shows panel 144 being similar to panel 126 in FIG. 20, except that panel 144 has an internal power supply and a surface data grid 146. Surface data grid 146 can be used to instruct fastener 128 to lock or unlock, as required.

Figure 23:
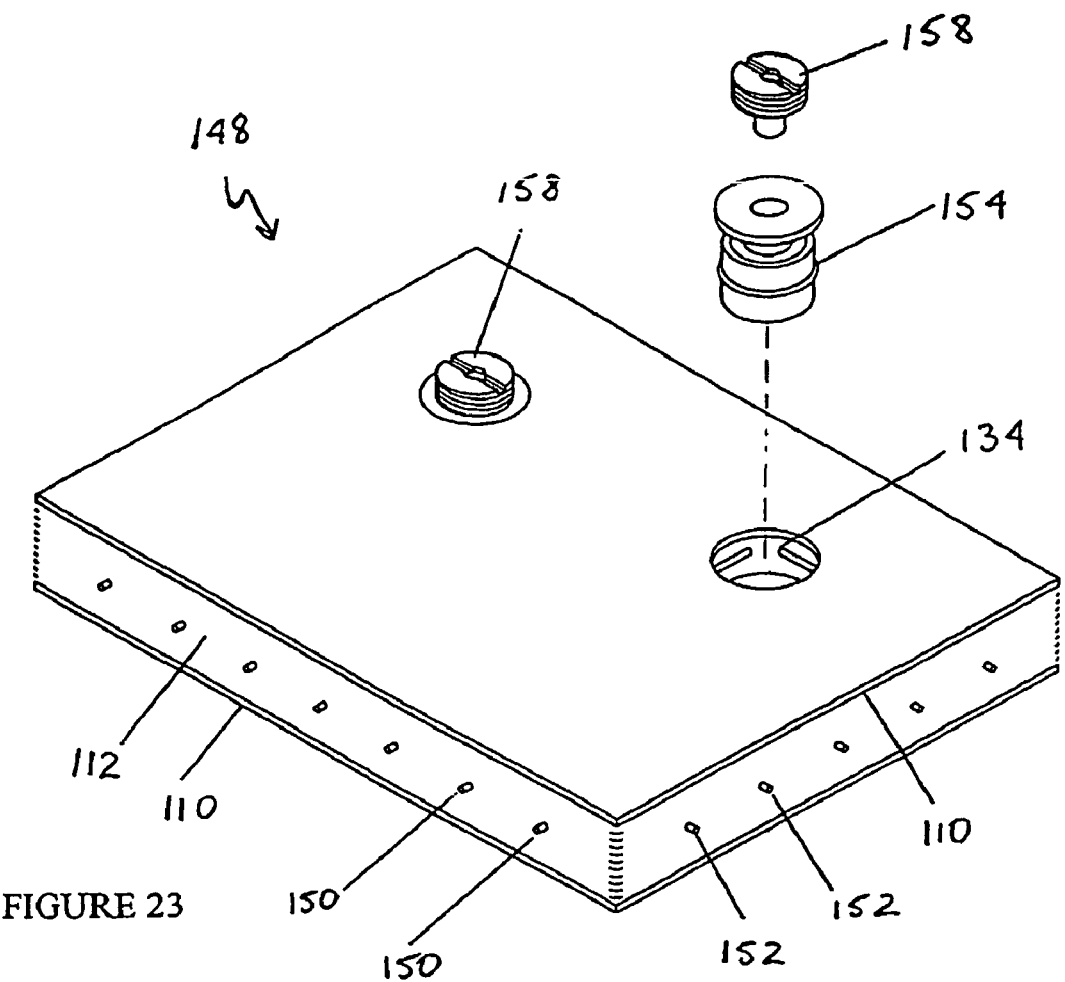
FIG. 23 shows a perspective view of a panel very similar to that in FIG. 20 but with an internal power source (not shown) and expanding on detail of the fastener.

In FIG. 23, panel 148 delivers data, assisted by an external power supply (not shown). Data is delivered by data wires 150, being "y" coordinate wires and data wires 152, being "x" coordinate data wires. Fasteners 154 are located at addressable Cartesian coordinates located at the intersection of wires 150 and 152 and thus fasteners 154 can be addressed individually.

Figure 24:
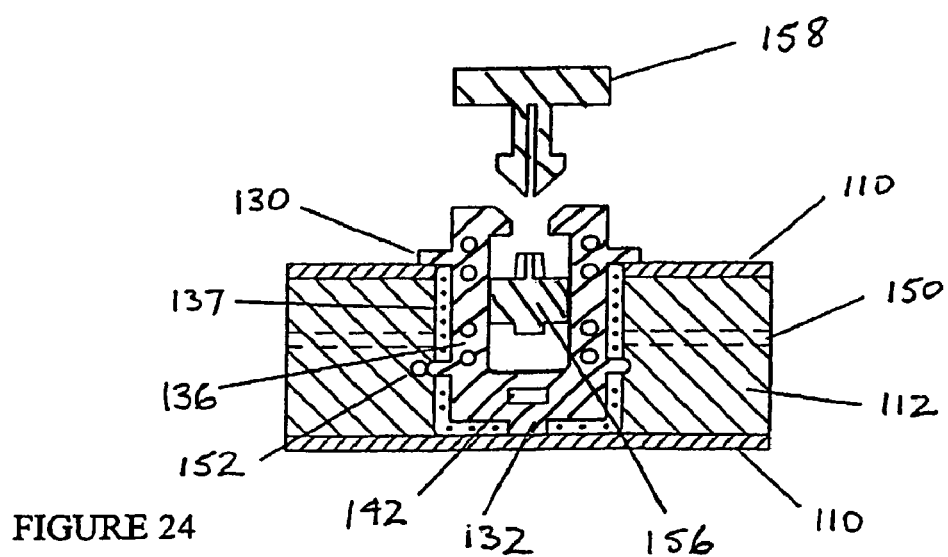
FIG. 24 shows in cross sectional view the further detail of the fastener in FIG. 23.

As shown in FIG. 24, fastener 154 includes electrical contacts 130 and 132 for making contact with metal layers 110, hot melt heater 130 for melting hot melt adhesive 137 and remotely activatable element 156 which can engage or disengage fastening component 158.

Figure 25:
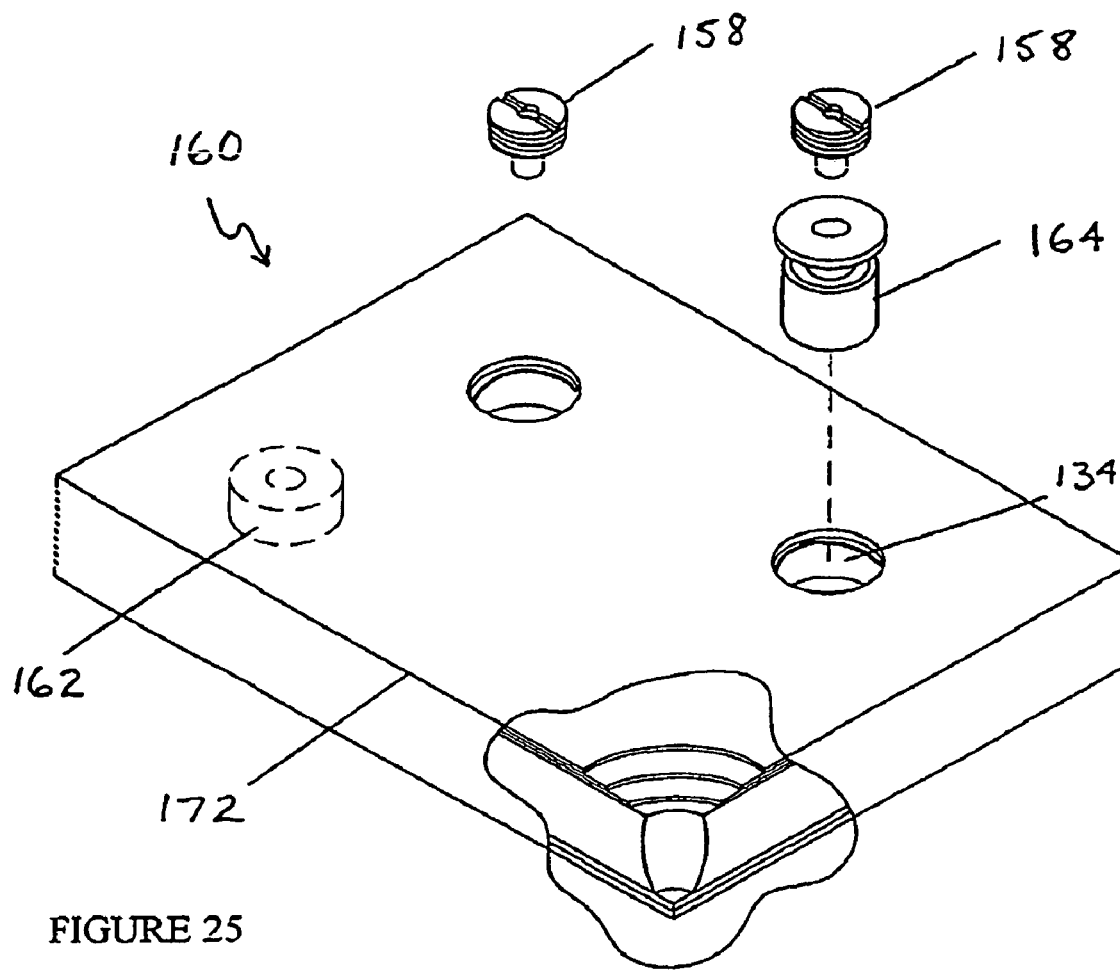
FIG. 25 is a perspective view, partly cut away, of a further example of a product being a panel.
Figure 26:
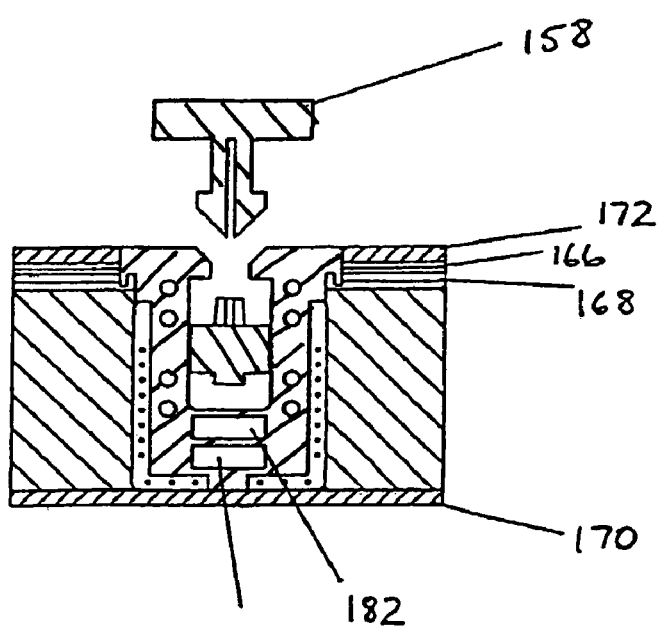
FIG. 26 is a cross sectional view of part of the panel of FIG. 25, showing in detail one of the fasteners.

In FIG. 25, panel 160 has an internal power source, battery 162. Panel 160 is composed of several layers, as shown in FIG. 26. Fastener 164 is connected to power layer 166 and data layer 168, with layer 170 acting as an earth. Panel 160 can have an outer layer of plastic 172.

Locking and unlocking of fastener 164 may be instructed via data delivery through data layer 168, power being supplied through power layer 166 powered by battery 162.

In FIG. 27, panel 174 is a metal/foam/plastic laminate with an internal power supply, battery 162. Energy delivery is effected by metal layer 110 or a second layer 176 located under this.

Fastener 178 is activatable by a broadcast which is received via address system chip 180 which in turn activates switch 182.

With reference to panel 174 in FIG. 29, this includes communication device 184 and processor/memory 186 as well as battery 162.

Figure 30:
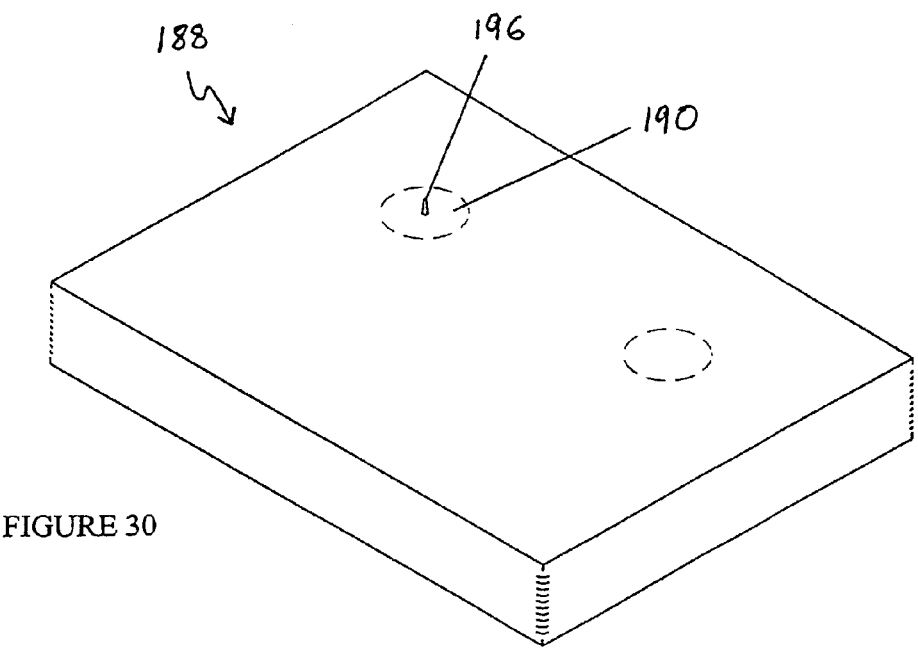
FIG. 30 is a perspective view of a further example of a product according to the invention.

Turning now to FIG. 30, panel 188 has embedded in it one or more projectile fasteners 190. This may be of the type, for example shown in FIGS. 31 to 33 or in FIGS. 34 and 35.

Figure 31:
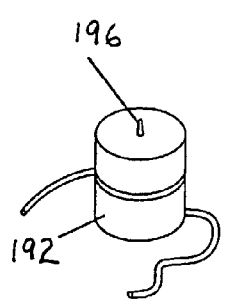
FIGS. 31 to 33 show a sequence relating to a first form of projectile device which can be used in relation to the device of FIG. 30.
Figure 32:
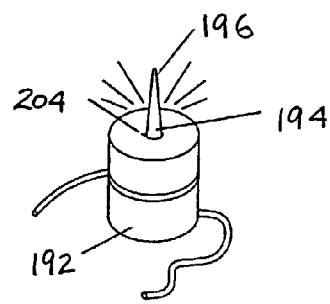
Figure 33:
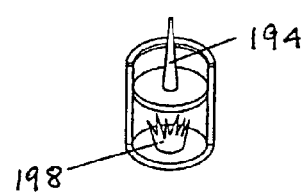
Figure 34:
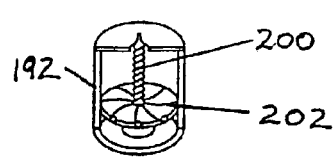
FIGS. 34 and 35 show a second form of projectile device.

In FIGS. 31 to 33, fastener casing 192 encloses nail 194, the tip 196 of which is visible in the surface of panel 188. High velocity explosive 198 in the base of fastener casing 192 is activated in a suitable way (eg, remotely) to explode nail 194 as shown in FIG. 33. This can be used, for example, to secure panel 188 to another structure (not shown).

As an alternative to the use of nail 194, fastener casing 192 may include screw 200, having turbo head 202. Use of a low velocity explosive under turbo head 202 will cause screw 200 to rotate and move upwardly to the position shown in FIG. 35. This can be used to screw panel 188 to another structure (not shown).

Figure 35:
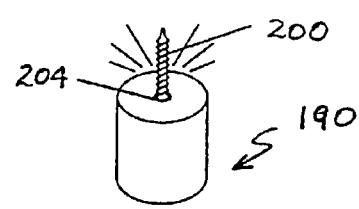
Figure 36:
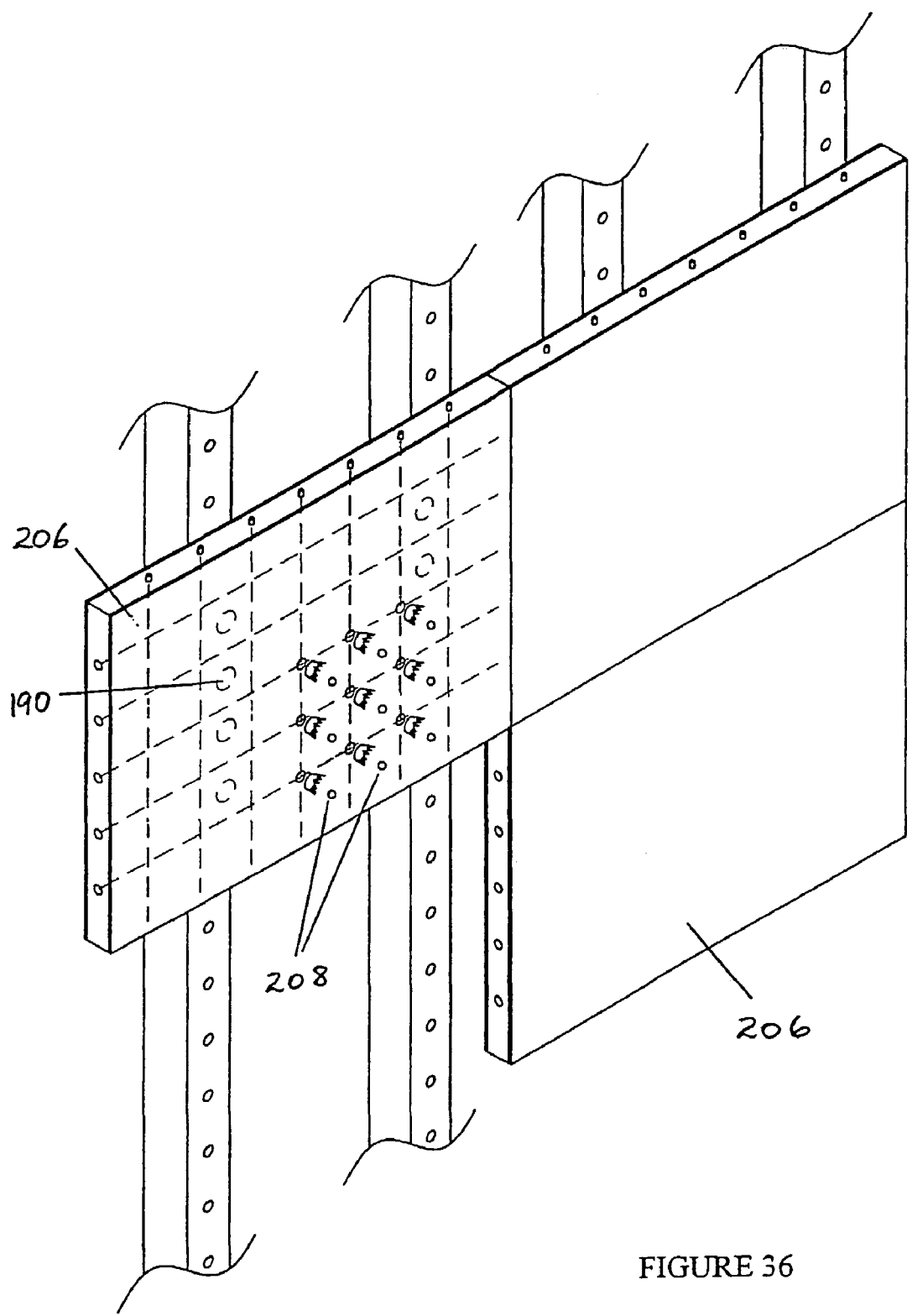
FIG. 36 shows a perspective partial view of a cladding in which projectile devices similar to those in FIGS. 31 to 35 have been installed as anti-personnel devices.

It will be noted that, as shown in FIGS. 32 and 35, nail 194 and screw 200 are retained within casing 192 because of the size of opening 204 in casing 192 and the size of the heads of nail 194 and screw 200 respectively. FIG. 36 shows a version of the invention in which projectiles such as nail 194 and screw 200 are not retained in casing 192.

In FIG. 36, one or more of panels 206 include casings similar to casing 192 in FIGS. 31 to 35, except that the projectiles may be wholly contained therein and may not penetrate the surface until activated.

The projectiles used may include items such as nails 194 and screws 200 and also metal balls 208 or other items of shrapnel.

The opening 204 in casing 192 and the dimensions of the projectile in each case are adjusted so that the projectile, once fired, leaves casing 192 entirely.

Panels 206 in FIG. 36 can be useful to deter graffiti or as anti-personnel means to cause damage to personnel who are not authorised to approach the panel in question.

The projectiles are preferably activated by high velocity explosive, which in turn is triggered by an ultrasound or other detector. When the panel is in "alert mode", and the detector detects unauthorised approach, the projectiles will be fired at the intruder.

INDUSTRIAL APPLICABILITY

It will be apparent from the above that the products and method of the invention have wide applicability in many fields of industrial endeavour.

The invention claimed is:

1. A product being a pipe, panel, sheet or partly formed product, the product having at least one fastener, and having a first function as, respectively, a part, panel, sheet or partly formed product and a second function different from the first, the second function being two or more of those chosen from the group consisting of delivery of energy for a first purpose, delivery of energy for a second purpose, delivery of data for a first purpose, delivery of data for a second purpose and switching, wherein there is incorporated in the product or in part thereof means capable of enabling the product to be used as a medium to perform the second function.

2. The product claimed in claim 1, wherein the second function is delivery of energy or data for a first purpose and delivery of energy for a second purpose, the second purpose being different from the first purpose.

3. The product of claim 2, wherein the product is a panel which also includes at least one fastener, the delivery of energy or data for the first purpose supplies energy or data to the fastener for fastening or unfastening and the delivery of energy for the second purpose provides heat activation.

4. The product of claim 3, wherein the heat activation is adapted to activate a hot melt strip fastener.

5. The product claimed in claim 2, wherein both deliveries are effected by a single medium.

6. A method of manufacturing the product of claim 1, the method including the step of adding to or incorporating in the product, or in an element of it, the means capable of enabling the product to be used as the medium to perform the second function.

* * * * *